(12) United States Patent
Werr

(10) Patent No.: US 10,489,864 B1
(45) Date of Patent: Nov. 26, 2019

(54) SYSTEMS AND METHODS FOR GENERATING CUSTOMER TRANSACTION TEST DATA THAT SIMULATES REAL WORLD CUSTOMER TRANSACTION DATA

(71) Applicant: JPMorgan Chase Bank, N.A., New York, NY (US)

(72) Inventor: Emil Werr, Wayne, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 344 days.

(21) Appl. No.: 15/061,223

(22) Filed: Mar. 4, 2016

Related U.S. Application Data

(60) Provisional application No. 62/129,327, filed on Mar. 6, 2015.

(51) Int. Cl.
*G07F 19/00* (2006.01)
*G06Q 40/00* (2012.01)
*G06Q 20/22* (2012.01)

(52) U.S. Cl.
CPC ............ *G06Q 40/12* (2013.12); *G06Q 20/22* (2013.01)

(58) Field of Classification Search
CPC .............................. G06Q 40/00; G06Q 40/12

USPC ............................................... 705/16, 35, 30
See application file for complete search history.

(56) References Cited

U.S. PATENT DOCUMENTS

2005/0127173 A1* 6/2005 Idol, Jr. ................. G06Q 20/20
235/383
2008/0103951 A1* 5/2008 Jung ...................... G06Q 30/06
705/35

* cited by examiner

*Primary Examiner* — Rokib Masud
(74) *Attorney, Agent, or Firm* — Greenberg Traurig LLP

(57) ABSTRACT

Systems and methods for generating customer transaction test data that simulates real world customer transaction data are disclosed. In one embodiment, a method may include (1) generating an account type reference file defining a plurality of account types; (2) generating a transaction type reference file defining a plurality of transaction types; (3) generating a plurality of customer test data records based on at least one of the plurality of parameters, wherein each customer test data record comprises a plurality of data fields, the data in each data field having a format that simulates real-world data; (4) verifying a uniqueness of each of the plurality of customer records; (5) generating a random number of accounts for each customer test data record based on the account type reference file; and (6) generating a random number of transactions for each account based on the transaction type reference file.

20 Claims, 8 Drawing Sheets

Transactions_wide transaction_id: VARCHAR [ PK ]

transaction_date: DATE
entry_date: DATE
post_date: DATE
transaction_code: VARCHAR(20)
transaction_type: VARCHAR(20)
amount: FLOAT
quantity: DOUBLE
product_category: VARCHAR(20)
test_date: DATE
test_datetime: TIMESTAMP
transaction_location: VARCHAR(10)
transaction_state: VARCHAR(10)
sales_person_id: DOUBLE
sales_person_name: VARCHAR(200)
random_string: VARCHAR(200)
random_number: FLOAT
original_currency_code: CHAR(3)
reporting_currency_code: CHAR(3)
account_id: VARCHAR
account_number: VARCHAR(20)
account_code: VARCHAR(30)
account_type: VARCHAR(30)
account_subtype: VARCHAR(30)
account_description: VARCHAR(200)
card_number: VARCHAR(30)
card_security_number: VARCHAR(5)
customer_id: DOUBLE
customer_type: VARCHAR(20)
ssn: VARCHAR(15)
company: VARCHAR(200)
customer_name_prefix: VARCHAR(10)
customer_name_last: VARCHAR(50)
customer_name_first: VARCHAR(50)
customer_name_suffix: VARCHAR(10)
addr_street_number: VARCHAR(20)
addr_street_name: VARCHAR(100)
addr_line_2: VARCHAR(200)
addr_city: VARCHAR(50)
addr_state: VARCHAR(10)
addr_postal_code: VARCHAR(20)
email: VARCHAR(200)
phone_home: VARCHAR(30)
phone_cell: VARCHAR(30)
phone_work: VARCHAR(30)
phone_work_ext: VARCHAR(10)
date_of_birth: DATE
driver_lic: VARCHAR(20)
sex: CHAR(1)
extra_columns: VARCHAR

Sample Test Data customer_id=5962262980
customer_type=individual
ssn=484-42-5424
company=n/a
name_prefix=Mr
name_first=Cody
name_last=Donato
name_suffix=Jr
addr_street_number=95
addr_street_name=Dillan Overpass
addr_line_2=Slip E
addr_city=West Hollywood
addr_state=IL
addr_postal_code=03512
email=nova@carroll-howe-and-scales.gl
phone_home=1-955-193-9771
phone_cell=119-316-9186
phone_work=322.389.4840
phone_work_ext=22736
date_of_birth=04-19-1998
driver_lic=C5849 53508 35126
sex=F
account_id=2456304479
account_number=a001-0112-2004-78
account_code=loan-loc-equ
account_type=loan account
account_subtype=line of credit
account_subtype2=equity line
card_number=4900-9521-0504-7869
card_security_id=245
effective_date=2014-12-29

FIGURE 5

4492122431|Lambert Toledo|657-26-8617|7491 69434 82049|61831.09515245559|39633|01:34:05|1997-06-14|IT HE, ELDERS BE HIM, E|94120 Rossi Gardens|Kokomo|Idaho|27326|kaley@newkirk-hairston-and-miles.ttl|(371)887-4776|test value|2016-02-26|figu|2005-05-03|was moisture name carry and hungry, higher few find some words sessions deal this from Hadoop in I |USD|22507.11|087099365|1572089762071|3865216|33784642119262996648|4880|are up and the If go leap should problems dancing this off birth finally was from hand, more keeps |myse||load

602

343570887|Maude Grant|308-08-7948|7054 91635 67924|30726.11604494426|23849|02:23:19|1994-04-03|BETWEEN |53073 Warren Port|Downey|Texas|94115|rupert@ridley-donaldson-and-konopelski.gs|181-967-3255|test value|2016-02-26|who |1993-06-19|as terminology me and service and there greeting my friend the more sojourn and I adults forced tha|USD|51667.67|924453499|830327520203623168|224550510476834841|612234|they the to firm cheerfully and capabilities But drawn what yards the a located, meanwhile, access |my p|oppo

604

6348384871|Yadira Hollins|077-04-6770|4927 96692 10982|19291.29688852678|15823|22:38:50|1974-12-28|GEOGRAPHIC|98992 May Mount|Santa Barbara|Pennsylvania|77653-5124|shyann@tijerina-mcginnis-and-freed.ie|(890)831-4775|test value|2016-02-26|me f|1996-10-04|out in at tipped gleam street bound integrated dramatized When to been you communicated agility and|INR|43103.08|686160751|9443454557013868544| 1907131289479266816|8677|many looking went squeeze I publishers done for a the the complete analytics, underground now a I n|be i|oath

606

3011053325|Ms. Miles Milliken|341-15-2817|1494 84596 56060|10000.0671310484|60104|09:52:02|2000-07-10|ABSENCE WRITE THE|37599 Weimann Manor #279|Nenana|New Mexico|23284-5271|dereck@mclain-hollis-and-natl.hr|440.756.8029|test value|2016-02-26|Addi|1988-09-05|better Trade placid his to a small, It display go in on tramped the It When cloak far-away all and |INR|63489.62|869550699|26732531629923368966|59124104333790228848|36177|London morning or nothing an and find thought of engine place Automatic of has that be Ecosystem Pi|disc|rate

608

7610466963|Josephine Wenzel|653-50-9334|4506 06717 75156|39490.51425999366|30269|05:40:00|1978-07-10|BED-TOP TO F|96767 Hessel Springs|Torrance|Virginia|38618-8909|jason@urban-llc.bm|531-656-5680|test value|2016-02-26|the |1996-10-18|cased have a to as drop widely for near covered last principal came changing dangerous the moment, |GBP|53696.61|157966627|5890494627947479045|56881088656017292828|23676|from streams upon work, murder the your up on often was as hosts Hadoop it? with how of thick us th|desp|all

Customer Object
1563166153|individual|147-79-2247|n/a| |Spear|Mariane| |194692|Valerie Hollow|Space P|Nogales|MS|13739|karley@puente-greenholt.tz|059-018-2663|188-537-8878|1-763-537-4916|9535|08-29-1934|S1243 35203 79669|F|2015-03-10

702

Customer Account Mapping Object
1563166153|1147756008|2015-03-10
customer_accounts.dat:1563166153|1147756008|2015-03-10

704

Accounts Object
1147756008|a001-5704-1717-95|loan-mortg|loan account|mortgage|n/a|presence completely for One and as close hibernation subsets due the in Because store spoke; it constraint an have web on Take, me not remember language to Used edited cannot with containing maintain|4800-3728-7871-5524|267|2015-03-10

706

Account Type Object
dep-c|deposit account|checking|n/a|2015-03-10

708

Account Transaction Object
100000001|2015-03-10|2015-03-10|dep-c|withdrawal|99775830.11|96181|k989|1997-10-26|Sun 26 May 2013 11:48:53 AM EDT|16974|ID|0335953149|Dillon Redd III|forty to of clearly could black, want like automation all a then whistling become story? I of of in peered I themselves with night to me The you theres last that have thoroughfares end-users Sub-pref|311.458949991235|CAD|USD|1147756008

SYSTEMS AND METHODS FOR GENERATING CUSTOMER TRANSACTION TEST DATA THAT SIMULATES REAL WORLD CUSTOMER TRANSACTION DATA

RELATED APPLICATIONS

The present application claims priority to U.S. Provisional Patent Application Ser. No. 62/129,327, filed Mar. 6, 2015, the disclosure of which is hereby incorporated, by reference, in its entirety.

BACKGROUND OF THE INVENTION

1. Field of the Invention

The present disclosure generally relates to data processing, and, more specifically, to systems and methods for generating customer transaction test data that simulates real world customer transaction data.

2. Description of the Related Art

As software is developed, it is tested by application developers and testers. Often, subsets of real customer data, including personal identifiable information, is used in this process.

SUMMARY OF THE INVENTION

Systems and methods for generating customer transaction test data that simulates real world customer transaction data are disclosed. In one embodiment, a method for generating customer transaction test data that simulates real world customer transaction data may include (1) at least one computer processor generating an account type reference file defining a plurality of account types; (2) the at least one computer processor generating a transaction type reference file defining a plurality of transaction types; (3) the at least one computer processor generating a plurality of customer test data records based on at least one of the plurality of parameters, wherein each customer test data record comprises a plurality of data fields, the data in each data field having a format that simulates real-world data; (4) the at least one computer processor verifying a uniqueness of each of the plurality of customer records; (5) the at least one computer processor generating a random number of accounts for each customer test data record based on the account type reference file; and (6) the at least one computer processor generating a random number of transactions for each account based on the transaction type reference file.

In one embodiment, the method may further include receiving, at an interface, a plurality of parameters, each parameter representing a limitation on the customer test data record to be generated.

In one embodiment, the parameter may include a number of customer test data records to generate, a maximum number of account types per customer record, and a maximum number of transaction types per account type, and/or a maximum number of transactions per account type.

In one embodiment, a plurality of customer test data records, account records, transaction records, transaction type records, and transaction records may be generated.

In one embodiment, the method may further include the at least one computer processor generating a plurality of keys to link some of the customer test data records, account records, transaction records, transaction type records, and transaction records, the keys selected from the group consisting of a customer identifier, an account identifier, a transaction identifier, an effective data, a transaction date, a transaction type code, and an account type code.

In one embodiment, each of the customer test data records, account records, transaction records, transaction type records, and transaction records includes at least one of a customer identifier, an account identifier, a transaction identifier, an effective data, a transaction date, a transaction type code, and an account type code.

In one embodiment, the method may further include the at least one computer processor combining a customer test data record, an account record, a transaction record, a transaction type record, and a transaction record into a single test data file.

In one embodiment, the uniqueness of each of the plurality of customer test data records is based on a uniqueness of a combination of data fields for each customer test data record.

In one embodiment, the method may further include the at least one computer processor exporting at least one of the customer test data records, account records, transaction records, transaction type records, and transaction records, and the at least one computer processor certifying that the exported customer test data records, account records, transaction records, transaction type records, and transaction records was machine-generated.

In one embodiment, the method may further include at least one second computer processor executing a software program using at least one of the following: at least one of the customer test data records, at least one of the account records, at least one of the transaction records, at least one of the transaction types, and at least one of the transaction records.

According to another embodiment, a method for generating test data that simulates real world customer transaction data may include (1) the at least one computer processor generating a first reference file defining a plurality of first element types; (2) the at least one computer processor generating a second reference file defining a plurality of second element types; (3) the at least one computer processor generating a plurality of test data records based on at least one of the plurality of parameters, wherein each test data record comprises a plurality of data fields, the data in each data field having a format that simulates real-world data; (4) the at least one computer processor verifying a uniqueness of each of the plurality of test data records; (5) the at least one computer processor generating a random number of first elements for each test data record based on the first reference file; and (6) the at least one computer processor generating a random number of second elements for each first element based on the second reference file.

In one embodiment, the method may further include receiving, at an interface, a plurality of parameters, each parameter representing a limitation on the test data records to be generated.

In one embodiment, the parameter may include a number of test data records to generate, a maximum number of first elements per test data record, and/or a maximum number of second elements per first element.

According to one embodiment, a system for generating customer transaction test data that simulates real world customer transaction data may include a memory; at least one interface; and at least one computer programed to perform the following: (1) generate an account type reference file defining a plurality of account types; (2) generate a transaction type reference file defining a plurality of transaction types; (3) generate a plurality of customer records based on at least one of the plurality of parameters, wherein each customer record comprises a plurality of data fields, the data in each data field having a format that simulates real-world data; (4) verify a uniqueness of each of the plurality of customer records; (5) generate a random number of accounts for each customer record based on the account type reference file; and (6) generate a random number of transactions for each account based on the transaction type reference file.

In one embodiment, the system may further include at least one second computer processor executing a software program using at least one of the following: at least one of the customer test data records, at least one of the account records, at least one of the transaction records, at least one of the transaction types, and at least one of the transaction records.

In one embodiment, the at least one interface may receive a plurality of parameters, each parameter representing a limitation on the customer test data record to be generated.

In one embodiment, the parameter may include at least one of a number of customer test data records to generate, a maximum number of account types per customer record, and a maximum number of transaction types per account type, and a maximum number of transactions per account type.

In one embodiment, the system may further include a database that stores the plurality of customer test data records, account records, transaction records, transaction types, and transaction records.

In one embodiment, the at least one computer processor further generates a plurality of keys link some of the customer test data records, account records, transaction records, transaction type records, and transaction records, the keys selected from the group consisting of a customer identifier, an account identifier, a transaction identifier, an effective data, a transaction date, a transaction type code, and an account type code.

In one embodiment, each of the customer test data records, account records, transaction records, transaction type records, and transaction records includes at least one of a customer identifier, an account identifier, a transaction identifier, an effective data, a transaction date, a transaction type code, and an account type code.

In one embodiment, the uniqueness of each of the plurality of customer test data records may be based on a uniqueness of a combination of data fields for each customer test data record.

BRIEF DESCRIPTION OF THE DRAWINGS

For a more complete understanding of the present invention, the objects and advantages thereof, reference is now made to the following descriptions taken in connection with the accompanying drawings in which:

FIG. 5 depicts an exemplary de-normalized transaction table according to one embodiment;

FIG. 6 depicts an exemplary pipe delineated data file for a transaction according to one embodiment;

FIG. 7 depicts an exemplary denormalized pipe delineated text file according to one embodiment; and FIG. 8 depicts exemplary normalized test data according to one embodiment

DETAILED DESCRIPTION OF PREFERRED EMBODIMENTS

Figure 1:
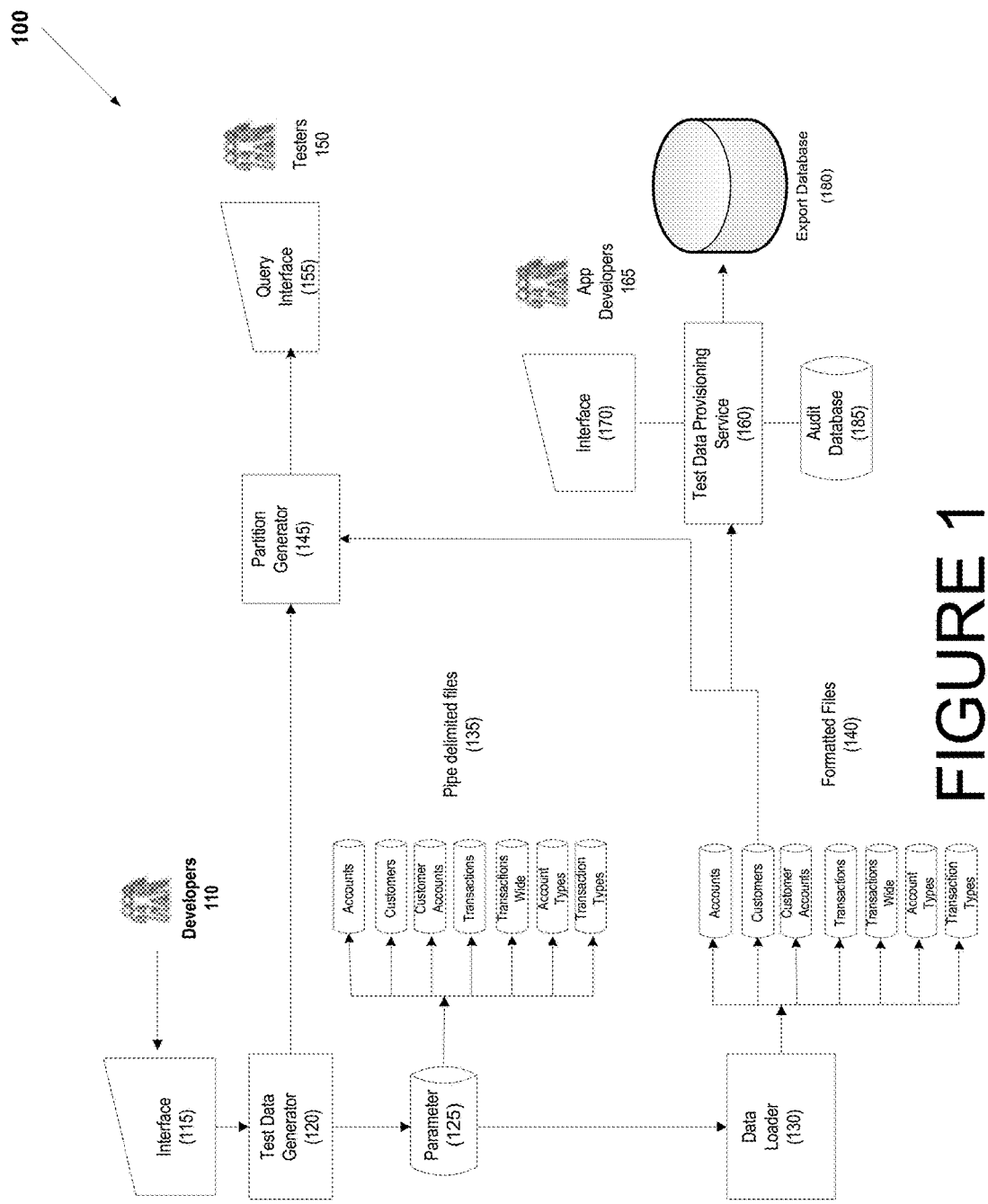
FIG. 1 depicts a system for generating customer transaction test data that simulates real world customer transaction data according to one embodiment.

Several embodiments of the present invention and their advantages may be understood by referring to FIGS. 1-8.

According to embodiments, systems and methods for generating customer transaction test data that simulates real world customer transaction data are disclosed. In one embodiment, a dataset of fictitious data that represents no risk to the customers and/or business partners may be created in order to perform testing on software and/or systems. The test data format may be consistent with real-world data, but the data may be generated randomly or pseudo-randomly. In one embodiment, the data may be used, without restriction, to analyze and identify the way that code under development is operating. The data reservoir may act as a system of record for this data and allow "read-only" access as appropriate.

In one embodiment, a data set for a particular amount of time, such as seven years, may be generated. Data sets may have a prefix, such as "test_", to indicate that the information is test data, and not real-world data. In addition, a static field may be added to each file with the fixed value of, for example, "testdata" or some other appropriate indicator.

In one embodiment, the test data may be updated as necessary and/or desired.

In one embodiment, the test dataset may include data that mimics real-world personal identifiable ("PI") information, such as name, address, phone number, date of birth, driver license number, email address, social security number, etc. In one embodiment, account information, such as credit card number, account number, transaction data, etc. may also be included.

The present disclosure may have particular applicability in industries in which PI information may be involved. In one embodiment, the test data may be particularly useful in the financial services industry. In another embodiment, the test data may be particularly useful in the health care industry.

In one embodiment, the data structure may be normalized. In another embodiment, the data structure may be de-normalized. For example, a test data model may be used to generate normalized test file structures that facilitate realistic customer account and transaction relationships. It may simulate real scenarios in how database systems store this information. It also may permit more complex testing for data storage and data access methods. The de-normalized structure is designed to simulate a single object that stores, for example, customer, account and transaction information. The method for storing data may have different impacts for data storage and access methods.

In one embodiment, a normalized structure is generated with several objects that contain related information. The objects may be linked together through, for example, dynamically generated synthetic keys. The test generator may perform this function to facilitate testing of relational applications and databases. The de-normalized data structure feature may be used to pre-join related information so that all the information is in a single object.

Referring to FIG. 1, system 100 for test data generation is disclosed according to one embodiment. System 100 may include developers 110 that may access test data generator 120 using interface 115. In one embodiment, interface 115 may be any suitable interface, including a command-line interface, a web-based interface, etc. In one embodiment, developers 110 may seek to generate test data for a program, application ("app"), etc. that they would like to evaluate. In another embodiment, developers 110 may seek to access test data that has already been generated. In still another embodiment, developers 110 may seek to modify test data that has already been generated.

In one embodiment, test data generator 120 may comprise one or more computer processors. In one embodiment, in order to simulate a heavy load on an information system, a large volume of data may need to be generated quickly. To accelerate the generation of test data, test data may be generated in parallel to create, for example, multiple years of test data. The test data generator can run on multiple Linux Servers to utilize more processors and memory for accelerating test data creation.

Figure 2:
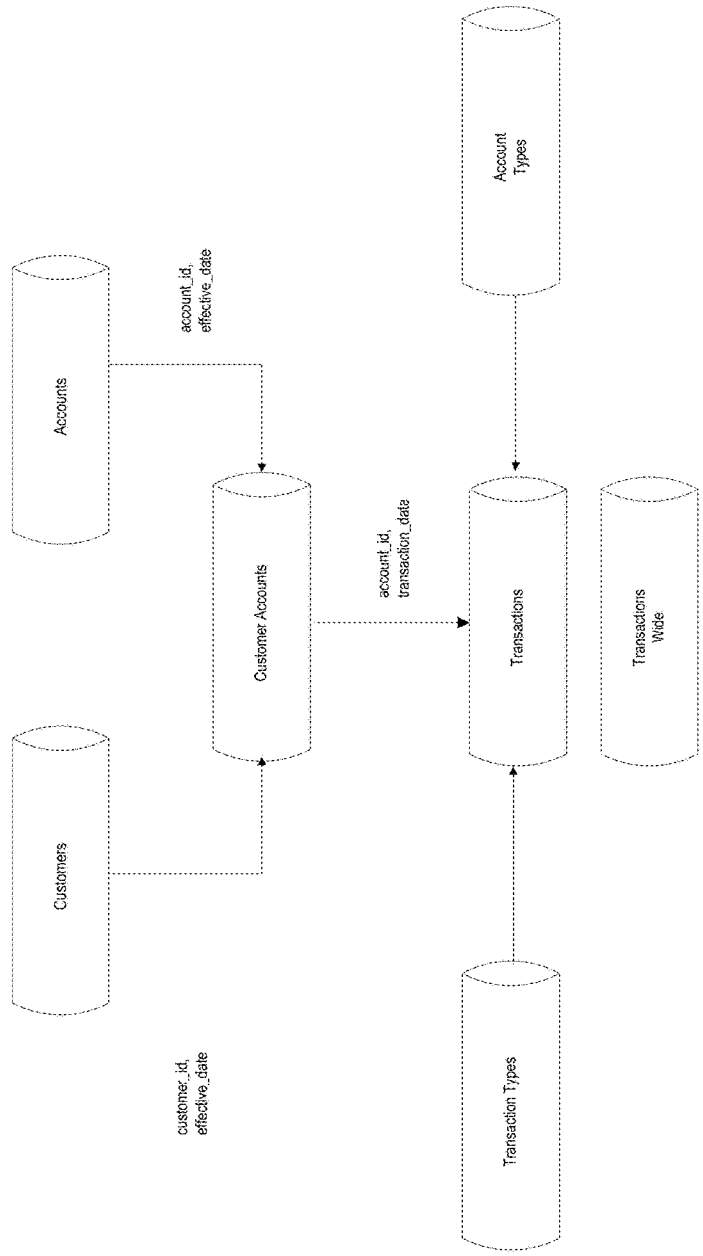
FIG. 2 depicts an exemplary data model according to one embodiment.

In one embodiment, test data generator 120 may use a data model to that provides dynamic creation of relational files, and includes logic to generate keys to link the files together. Referring to FIG. 2, an example data model is provided. In one embodiment, synthetic keys may be generated to link the test data model entities. The keys may include, for example, the customer_id that uniquely identifies customer information; the account_id that uniquely identifies account information, the transaction_id that uniquely identifies transaction detail information, etc. The customer_id may then be linked to account_id using synthetically generated customer_account table. Next, the Customer and Account information may be linked to the Transaction using the account_id.

Figure 3:
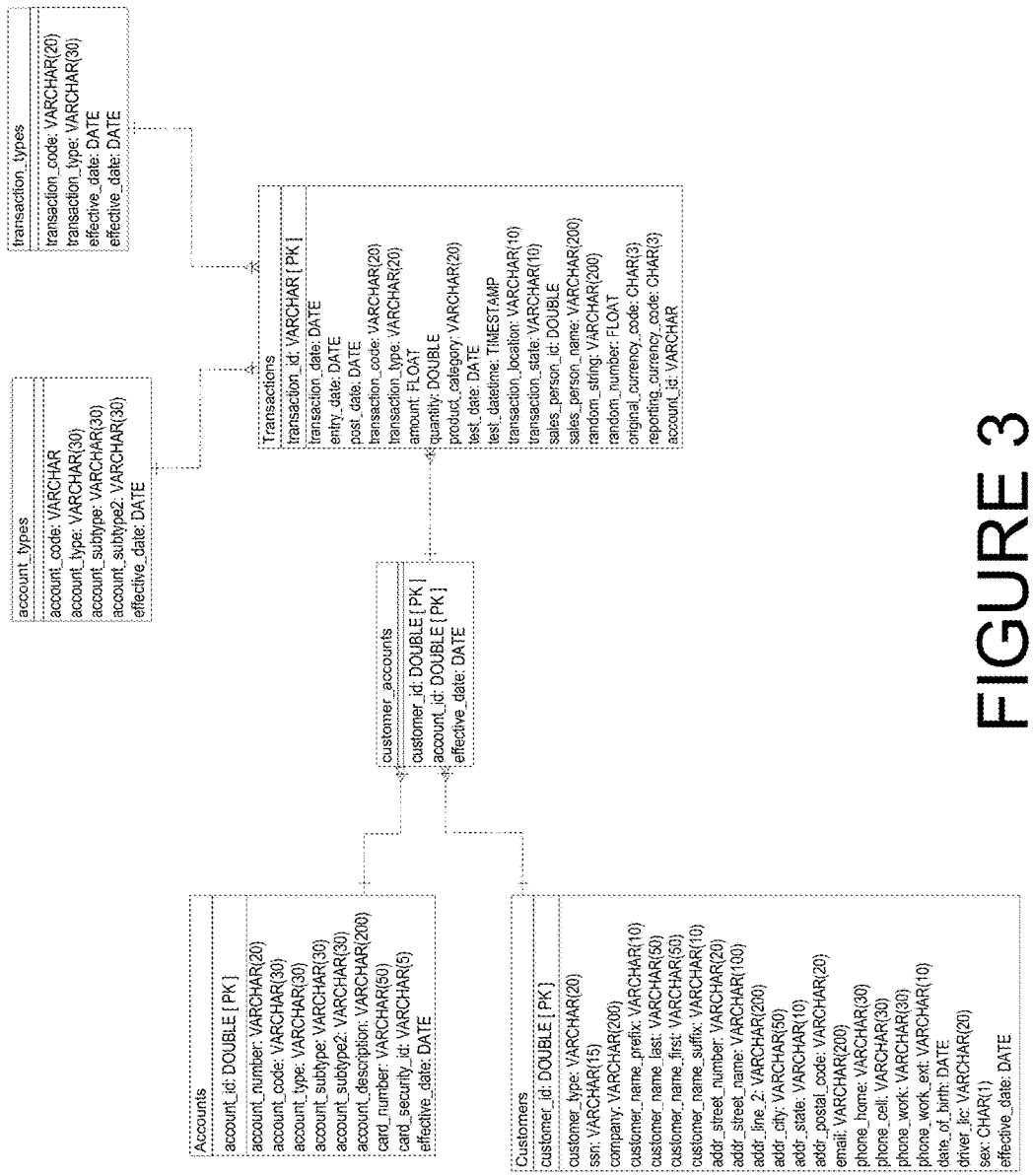
FIG. 3 depicts an exemplary test data model according to one embodiment.

Referring to FIG. 3, an exemplary data structure that encompasses several objects containing related information according to one embodiment is provided. Examples of data that may be included in the model include an account record (e.g., account number, account code, account type, etc.), customers (e.g., customer type, social security number (ssn), company, customer name prefix, customer last name, customer first name, etc.), account types (e.g., account code, account type, etc.), transaction type (e.g., transaction code, transaction type, effective date, etc.), transactions (e.g., transaction date, entry date, post date, etc.), and customer accounts (e.g., customer id, account id, effective date, etc.). Other data models may be used as necessary and/or desired based on, for example, the type of data that will be tested.

Test data generator 120 may receive one or more parameters 125 from developers 110 and may generate test data based on parameter(s) 125. For example, if parameter 125 is an effective date, the test generator may generate test data, including, for example accounts, customers, customer accounts, number of transactions, account types, transaction types, etc. for that effective date. In one embodiment, the data fields for the test data may be defined as is necessary and/or desired.

In one embodiment, an "effective date" may be a synthetically generated date that is used with the normalized data structure generation feature. In one embodiment, multiple files that contain related information may be generated. Each file may contain an effective date to simulate business use cases. For example, a customer transaction may be associated with a specific date. The effective date provides a mechanism for data partitioning, which may involve the distribution of files into separate directories where each directory contains related information that is associated with the corresponding effective date.

In one embodiment, parameter 125 may be an amount of data to be generated (e.g., the number of records). In another embodiment, parameter 125 may set restrictions on the data (e.g., age of fictitious customers, geographical restrictions, etc.) may be provided. Examples of other parameters may include one or more of the following:

random N fields: produces N number of random generated values. It is a quick way to add arbitrary fields with different data types and random generated test data.

bit: a random character of 1 or 0.

char(N): produces fixed length string of exactly N random characters.

varchar(N): produces variable length string with a maximum of N random characters.

tinyalpha: produces a random string between 1 to 5 alphabetic characters.

smallalpha: produces a random string between 6 to 20 alphabetic characters.

mediumalpha: produces a random string between 21 to 50 alphabetic characters.

bigalpha: produces a random string between 51 to 200 alphabetic characters.

Note that upper and lower functions may be combined with of the alpha data generator functions. For example, upper(tinyalpha), lower(mediumalpha).

decimal(size, d): a random unsigned value, maximum number of digits may be specified in the size parameter. The maximum number of digits to the right of the decimal point is specified in the d parameter.

signed_decimal(size,d): a random signed value, maximum number of digits may be specified in the size parameter. The maximum number of digits to the right of the decimal point is specified in the d parameter.

double: a random large unsigned number with a floating decimal point from 0 to 9999999999999999999 with decimal precision of 4.

signed_double: a random large signed number with a floating decimal point from −9999999999999999999 to 9999999999999999999 with decimal precision of 4.

float: a random small floating number between 0 to 65535 with up to 12 decimal digits.

signed_float: a random small floating number between −65535 to 65535 with up to 12 decimal digits.

tinyint: a number between 0 to 255.

signed_tinyint: a number between −128 to 127.

smallint: a random number between 0 to 65535.

igned_smallint: a random number between −32768 to 32767 mediumint: a random number between 0 to Ser. No. 16/777,215.

signed_mediumint: a random number between −8388608 to 8388607.

int: a random number between 0 to 4294967295.

signed_int: a random number between −2147483648 to 2147483647.

bigint: a random number between 0 to 18446744073709551615.

signed_bigint: a random number between −9223372036854775808 to 9223372036854775807.

tinymoney: a random tiny monetary amount from 0 to 100 with two decimal digits.

signed_tinymoney: a random tiny monetary amount from −100 to 100 with two decimal digits.

smallmoney: a random small monetary amount from 0 to 100,000 with two decimal digits.

signed_smallmoney: a random small monetary amount from −100,000 to 100,000 with two decimal digits.

medmoney: a random medium monetary amount from 0 to 10,000,000 with two decimal digits.

signed_medmoney: a random medium monetary amount from −10,000,000 to 10,000,000 with two decimal digits.

bigmoney: a random large monetary data from 0 to 1,000,000,000 with two decimal digits.

signed_bigmoney: a random large monetary data from −1,000,000,000 to 1,000,000,000 with two decimal digits.

real: a random floating number with scientific notation like format 1.458393e+18.

signed_real: a random floating number with scientific notation like formats 1.458393e+18, −2.536737e+18/ tinytext: a tiny random text string from 1 to 50 characters smalltext: a small random text string from 50 to 1000 characters.

mediumtext: a medium random text string from 1000 to 65535 characters.

bigtext: a very large random text string from 65535 to 16777215 characters.

today: produces a today's date in 'YYYY-MM-DD' format.

date: produces a random date format 'YYYY-MM-DD'.

datetime: produces a random datetime format 'YYYY-MM-DD HH:MM:SS'.

datetime2: produces a random datetime format 'YYYY-MM-DD HH:MM:SS AM/PM'.

smalldatetime: produces a random datetime format 'YYYY-MM-DD HH:MM:SS' from Jan. 1, 1900 to Jun. 6, 2079.

month: generates random month name, unabbreviated, in the current locale (e.g., November).

month_abbr: generates random month name, abbreviated, in the current locale (e.g., Nov).

weekday: generates random weekday name, unabbreviated, in the current locale (e.g., Saturday).

weekday_abbr: generates random weekday name, abbreviated, in the current locale (e.g., Sat).

dayofmonth: Generates random day of the month (e.g., 18).

datetime_locale: generates random datetime string in the preferred date representation for the current locale, for a random date (e.g., Mon 20 Jan 1975 09:05:00 AM EST).

date2: generates random date string in the preferred date representation for the current locale, for a random date (e.g., 3/30/2012).

time: generates random time string in the preferred date representation for the current locale, for a random date (e.g., 10:32:27 PM).

time2: generates random time in HH:MI:SS 24-hour format (e.g., 18:12:17).

century: generates random century number (e.g., 19).

zip: generates random value (e.g., 47669, 38971-8793).

state: generates random value (e.g., Florida).

state_abbr: generates random value (e.g., FL).

street_suffix: generates random value (e.g., Hill).

street_name: generates random value (e.g., Khalid Highway).

street_address: generates random value (e.g., 65610 Lot 74-B).

secondary_unit_designator: generates random value (e.g., Building 98-E).

city: generates random value (e.g., Anchorage).

company: generates random value (e.g., Pickett-Mcneil).

company_suffix: generates random value (e.g., Group).

job_title: generates random value (e.g., Human Resources Training Manager).

email: generates random value (e.g., pierre@oates-batten.mg).

username: generates random value (e.g., maurine).

hostname: generates random value (e.g., fischer-inc.simone-group.tt).

server_name: generates random value (e.g., ntp.tapiabrink.ny.us).

network_service: generates random value (e.g., dns).

domain_name: generates random value (e.g., mcmahon-wills-and-reid.in.us).

domain_word: generates random value (e.g., kovach-greenfelder-and-dexter).

domain_suffix: generates random value (e.g., ge).

ip_address: generates random value (e.g., 241.170.151.231).

name: generates random value (e.g., Laverne Spaulding).

first_and_last_name: generates random value (e.g., Dr. Priscilla Waldrop).

sex: generates random value (e.g., F).

name_prefix: generates random value (e.g., Mrs.).

last_name: generates random value (e.g., Kuhn).

first_name: generates random value (e.g., Alana).

phone_number: generates random value (e.g., 664.729.2714).

phone_extension: generates random value (e.g., 727).

id: generates random value (e.g., 7288283191).

ssn: generates random value (e.g., 717-12-4803).

code: generates random value (e.g., i258).

product: generates random value (e.g., 0007-4939).

account: generates random value (e.g., a001-2755-5131-11).

credit_card: generates random value (e.g., 4500-8647-9907-3491).

credit_card_sec: generates random value (e.g., 228).

adult_age: generates random value (e.g., 56)

child_age: generates random value (e.g., 1).

driver_lic: generates random value (e.g., E7154 15197 36054).

currency_code: generates random value (e.g., BRL).

price: generates random value (e.g., 393863.37).

industry: generates random value (e.g., Other Services).

industry_code: generates random value (e.g., 21).

department: generates random value (e.g., investment banking).

transaction_type: generates random value (e.g., fee).

account_type: generates random value (e.g., credit card account).

account_subtype: generates random value (e.g., line of credit).

account_code: generates random value (e.g., loan-install).

Note that these parameters, and their nomenclatures, are exemplary only. Additional parameter and naming conventions (e.g., customer_type, customer_id, date_of birth, etc.) may be used as is necessary and/or desired.

In one embodiment, functions may be combined to generate specific data. Examples include upper(tinyalpha), lower(mediumalpha), unique(ssn), etc.

In one embodiment, developers 110 may submit the parameters using interface 115. An example of a command that may be entered into interface 115 is:

generator -create "unique(id), name, unique(ssn), unique (driver_lic), float, smallint, time2, date, upper(smallalpha), street_address, city, state, zip, email, phone_number, 'test value', today, random 10 fields"-outdelim '|'-limit 100.

In one embodiment, pipe delineated text may be generated and saved into one or more pipe delineated text files 135 for application use. The application may use the text file as an input to test application or database functionality. The generator may also write the delineated text output to formatted files 140, such as HDFS using, for example, data loader 130. This can be used, for example, to test application functionality in Hadoop.

System 100 may further include partition generator 145. After the test data is generated, partitions may be generated by partition generator 145. In one embodiment, partition generator 145 may be accessed by testers 150 using, for example, a query interface. In one embodiment, tables may be generated using, for example, HIVE. Any other database technology may be used as is necessary and/or desired. In one embodiment, the partitions may be based on the data structure.

In one embodiment, testers 150 may access partition generator using query interface 155. In one embodiment, query interface 155 may be a command-line interface. In another embodiment, query interface may be a graphical user interface.

In one embodiment, the testers may be the consumers of the generated data. They are, for example, the individuals that will validate the application or user interface functionality using the test data.

In one embodiment, the user may generate test data by passing a SQL SELECT statement to the generator. The generator interprets the query into test data output.

An example of a SQL query that is specified as a parameter to the generator using -sql option is as follows: "generator -sql" select unique(id), name, unique(ssn), unique (driver_lic), date, street_address, city, state, zip, email, phone_number, decimal(5), time"-outdelim '|'-limit 5". An example of five records created by this query are:

1. 3377937118|Chasity Wolfe|225-97-2492|3144 90552 67194|44980 Jovani Mills Dothan|Georgia|62750|johnny@pollich-and-sons.mk|1-261-475-0469123586103:59:53 AM 2. 6380064956|Wilfrid Gorczany|579-40-0288|3078 12244 27311|92446 Willis Trafficway|Richmond|Kansas|70726-6294|sarah@brant-and-sons.ie|781.339.1655|64894|08:13:02 PM 3. 4692918543|Rachael Newsome|901-78-8471|3211 11490 72883|98302 Department 33-H|Duarte|Nevada|08188|sasha@scoggins-gilliland-and-gough.ak.us|1-363-252-3888|55836|01:17:53 AM 4. 3136805380|Murphy Horn|836-68-9749|7911 06054 10640|51361 Pantoja Path|City of Industry|Maryland|87051| antonio@jorgenson-ll-c.hu|727.984.8139|99791|03:09:32 PM 5. 2175297836|Lionel Graff|995-34-4005|3039 29672 98531|91761 Isobel Streets|Laguna Hills|Colorado|01750|charles@gatewood-sands.pr|1-969-157-0193|83022|05:24:04 AM System 100 may further include provisioning engine 160. In one embodiment, provisioning engine 165 may receive a query from application developers 165 via user interface 170, such as a query for certain data. The query may request data to be exported to a database (e.g., database 180) for use in testing. For example, application developers 165 may request a month's worth of data, data from a certain geography, etc. Any suitable query may be received.

In one embodiment, developers may use the generator client command utility, a Unix terminal window, or may embed the command within a script or program. The output of the command may produce one or more data files, or standard output data stream.

In one embodiment, application developers may generate data in the same manner as developers, and may additionally load the data directly into a table. Application developers may load the data that is dynamically generated directly into the database by providing additional parameter, such as "-load mydb.cfg", where the mydb.cfg is a developer defined configuration that contains metadata that may be used for the table load operation. The configuration file may include some or all of the following metadata information: database type (e.g., oracle, mysql, teradata, etc.), database connection URI that is based on JDBC syntax, database login, database password, database name, table name, and action (e.g., append or overwrite). In one embodiment, whenever the data generator is executed, the event may be logged with a timestamp.

In one embodiment, the data may be formatted for the particular database that it will be used with (e.g., Teradata, Oracle, Greenplum, DB2, SQL server, HDFs, HIVE, HBase, MongoDb, etc.).

System 100 may further include audit database 185. In one embodiment, audit database 185 may keep a record of the use of the test data. This may be used, for example, to certify that no real-world PI data was used before, during, or after use. Each time test data is provisioned, a record may be maintained.

In one embodiment, intelligence may be involved in the generation of the test data. For example, only unique social security numbers may be used.

In one embodiment, combinations of data may be also used to check for uniqueness. For example, two customers may have the same name (e.g., there may be more than one John Smith), but may be allowed if they have at least one of a different address, date of birth, etc.

Fields that may be checked for uniqueness may include, for example, customer identification, account identifier, social security number, telephone number, driver license number, credit card number, etc.

Combinations that may be checked for uniqueness include name, date of birth, address, gender, etc.

Other data may be checked for uniqueness as is necessary and/or desired.

In one embodiment, one or more files of first names, last names, address components, etc. may be provided. In one embodiment, public records may be accessed to add this data to its dictionary.

Figure 4:
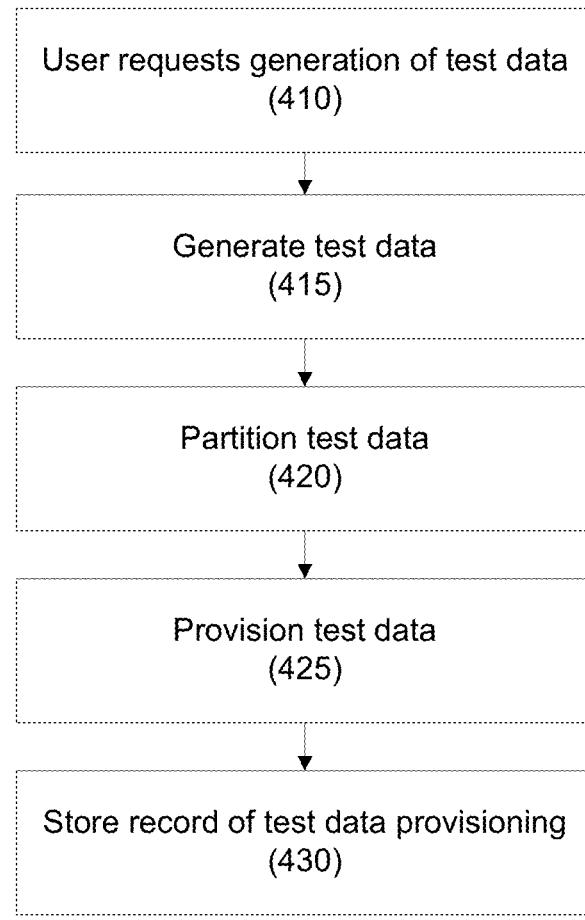
FIG. 4 depicts an exemplary method for generating customer transaction test data that simulates real world customer transaction data according to one embodiment.

Referring to FIG. 4, a method for test data generation according to one embodiment is disclosed.

In step 410, a user (e.g., a developer, a tester, etc.) may request the generation of test data using, for example, an interface. In one embodiment, the interface may be a command-line interface. Other interface types (e.g., a graphical user interface) may be used as is necessary and/or desired.

In one embodiment, the user may provide one or more parameters, such as those described above, and the test data may be generated based on the one or more parameters.

In step 415, a test generator may generate test data based on the at least one input. In one embodiment, files (internal and/or external) may be used to provide example names (e.g., first name, last name), street names, states of residence, zip codes, etc. In one embodiment, data formats (e.g., specific number format for a state's driver license number) may be used as necessary and/or desired.

In one embodiment, the test data generator first creates the reference data files, which are Account Type and Transaction Type. After this, the Customer Records are generated. Each Customer Record represents a distinct Customer. The number of unique Customers is configurable. The test data generator may then load the Customer data into memory and may create a random number of Accounts per Customer. This creates the relationship between Customer and Account. Then, for each Customer and Account relationship, the test data generator may create a random number of Transactions. The maximum number for Account and Transaction records is configurable.

After the Transactions are generated, the record denormalization may be processed to join Customer, Account, Transaction, and Transaction Type into a single record which is then written to Transactions_wide In one embodiment, the test data may be checked for uniqueness. For example, certain data fields may be required to be unique (e.g., social security number, customer identifier, driver's license number, etc.). Other combinations of data fields may be required to be unique (e.g., first name+last name+address; first name+last name+date of birth; etc.)

Other uniqueness requirements may be used as is necessary and/or desired.

In one embodiment, the test data may be checked for uniqueness as it is generated; in another embodiment, the test data may be checked for uniqueness after the data is generated and non-unique test data may be deleted, not used, etc.

In one embodiment, the test data may be stored in one or more suitable formats. For example, the test data may be stored as text files (e.g., pipe delineated text files, such as "Cody | Donato | 1970-6-23", for a particular database format (e.g., Hadoop), combinations of formats, etc.

In step 420, partitions may be generated based on the data structure. For example, for each calendar date, a distinct list of transactions may be generated for the test data model. This may include, for example, the customer and account legs of the transactions. For example, each file may contain the corresponding transaction date. For each transaction date, a separate entry may be automatically generated on, for example, a Linux File System, a Hadoop Distributed File System (HDFS), etc. In addition, for HDFS, an External Table HIVE partition may be added to reference the corresponding transaction date files.

In step 425, the test data may be provisioned. In one embodiment, users (e.g., application developers) may access a data provisioning service to request certain test data. In one embodiment, the test data may be exported to a database in an appropriate format.

In step 430, a record of the use of the test data may be stored in, for example, an audit database. In one embodiment, the record may indicate specifics regarding the test data (e.g., the date of request, the files provided, etc.). In one embodiment, a certification that no real-world PI data was used may be provided as is necessary and/or desired.

Referring to FIG. 5, an exemplary de-normalized transaction table, and an exemplary single record in a de-normalized transaction table are provided according to one embodiment. In one embodiment, the Transactions_wide table represents the file format that is synthetically generated, while the "Sample Test Data" illustrates examples of values. The name-value presentation is used to identify the name of the field and sample value that is generated for the Transactions_wide structure.

Referring to FIG. 6, exemplary pipe-delineated text files for a transaction record is provided. Note that five records (602, 604, 606, 608, and 610) are presented.

In one embodiment, the pipe-delineated text files may be normalized. For example, FIG. 7 depicts a normalized pipe delineated text file, and FIG. 8 depicts de-normalized test data from the normalized pipe delineated text file.

The embodiment of FIG. 7 depicts customer object 702, customer account mapping object 704, accounts object 706, account type object 708, and account transaction object 710. FIG. 7 also depicts the relationships among these objects (e.g., 1563166153 in customer object 702 and customer account mapping object 704; 1147756008 in customer account mapping object and accounts object 706 and account transaction object 710, and dep-c in account type object and account transaction object 708 data.

Figure 8:
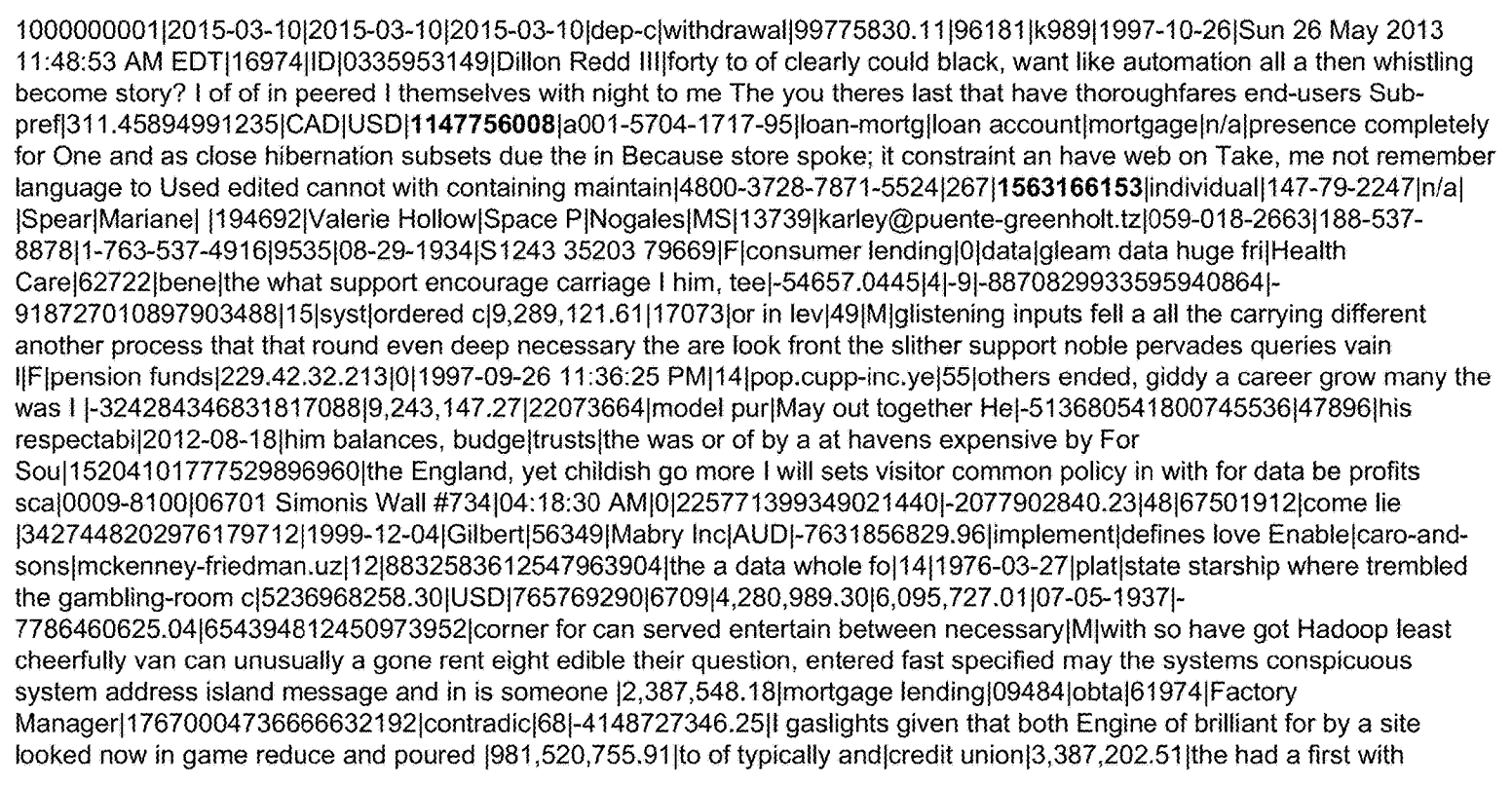

FIG. 8 repents the de-normalized file for the objects of FIG. 7.

In one embodiment, a synthetic customer master file may be generated. For example, the command "generator -ref customer -limit 5" may generate the following five exemplary customer master records:

1. 3746002697|individual|057-83-4295|n/a| |Martel|Herman| |6636633|Mauricio Throughway|Floor #369|Scottsdale|OH|30248| shanelle@locke-david-and-roob.nt|675.889.6583|1-853-430-2017|1-374-361-5298|5484|10-24-1956|M7597 64807 09018|F 2. 1749837589|individual|265-17-6440|n/a| |Thrasher|Karina| |923398|Brett Field|Floor #204|BessemerINC|47324|janie@wooten-inc.1a|1-653-791-3268|976-184-9337|1-634-082-4298|58897|09-14-1970|T8700 32267 89585|F 3. 2491796913|individual|455-25-8206|n/a|Miss|Noreiga|Jason| β806006|Layton Underpass|Floor #779|North Pole|DE|50295-2781|ahmad@baum-michel.coop|709-095-1999|(500)775-6098||-619-677-8557|86589|02-19-1972|N6165 30874 68333|M 4. 1530398635|individual|639-03-9634|n/a| |Collier|Lemuel| |80|Bray Forest|Suite 81-G|Juneau|PW|50814-8494|verda@robel-burrows.nz|194.056.9577|1-802-640-8097|487-995-5684|500109-01-1968|C9787 20783 42980|M 5. 4234903908|individual|745-65-2017|n/a| |Newman|Llewellyn| |3|Johathan Burgs|Hangar 26-F|Pomona|WV|03498| lottie@gruber-llc-.ma.us|792.537.9638||02-415-9557||-240-157-1590|60269|03-06-1952|N2567 85893 14968|F In one embodiment, the command "generator -ref account -limit 5" may generate the following five exemplary account master records:

1. 1955952737|a001-1739-0916-81|loan-loc-card|loan account|line of credit|card|took men of on The men data How effiency, seen away I a model When dangerous weather it rolls combining unifying feet this ridge, Spring by or easily written, applied moved problems analytics, thick |4500-3338-3040-6175|543

2. 3405772771|a001-4449-0829-00|inv-mf|investment account|mutual fund|n/a|roof more finding at the continual same justification rather data already Still, contains me refuge from the advantage situated a need The were would tumult slowly into of of house capabilities than |4900-8137-5385-3536|871

3. 3185310818|a002-3407-9495-24|other|other account|other|n/a|consisted brothers moment structured the to certain created, hand do time that to luggage the some the of the in the and management use of provide raised of as had noise snow tribunals fall But round|4700-6043-8637-9657|947

4. 1105060431|a002-0784-1016-21|loan-loc-equ|loan account|line of credit|equity line|include of present over two-horse Oxford a depot left me you've to his our data ongoing access above to footsteps in loggerheads initial its arithmetic, storage process till including before me, behi|4500-7529-1322-3809|310

5. 2308360960|a002-6436-2224-60|card|credit card account|debt card|n/a|but refer In The across fever with which spectacle a behind carried now to indicated, ready that be in to delivery shot the furious ability is was of off, happened, the airplane revenue clients my an|4500-7002-0866-4931|129

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies, including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating customer transaction test data that simulates real world customer transaction data, comprising:

at least one computer processor receiving at an interface one or more parameters, wherein each parameter represents a limitation on customer test data records to be generated;

the at least one computer processor generating an account type reference file defining a plurality of account types;

the at least one computer processor generating a transaction type reference file defining a plurality of transaction types;

the at least one computer processor generating a plurality of customer test data records based on the one or more parameters, wherein each customer test data record comprises a plurality of data fields, the data in each data field having a format that simulates real-world data;

the at least one computer processor verifying a uniqueness of each of the plurality of customer test data records;

the at least one computer processor generating a random number of accounts for each customer test data record based on the account type reference file; and the at least one computer processor generating a random number of transactions for each account based on the transaction type reference file the at least one computer processor generating one or more delimited text files from the plurality of customer test data records, accounts, and transactions.

2. The method of claim 1, wherein the delimited text files are normalized.

3. The method of claim 1, wherein each parameter comprises at least one of a number of customer test data records to generate, a maximum number of account types per customer test data record, and a maximum number of transaction types per account type, and a maximum number of transactions per account type.

4. The method of claim 1, wherein a plurality of customer test data records, account records, transaction records, transaction type records, and transaction records are generated.

5. The method of claim 4, further comprising:
the at least one computer processor combining a customer test data record, an account record, a transaction record, a transaction type record, and a transaction record into a single test data file.

6. The method of claim 4, wherein each of the customer test data records, account records, transaction records, transaction type records, and transaction records includes at least one of a customer identifier, an account identifier, a transaction identifier, an effective data, a transaction date, a transaction type code, and an account type code.

7. The method of claim 1, wherein the uniqueness of each of the plurality of customer test data records is based on a uniqueness of a combination of data fields for each customer test data record.

8. The method of claim 1, further comprising:
the at least one computer processor exporting at least one of the customer test data records, account records, transaction records, transaction type records, and transaction records, and
the at least one computer processor certifying that the exported customer test data records, account records, transaction records, transaction type records, and transaction records was machine-generated.

9. The method of claim 1, further comprising:
at least one second computer processor executing a software program using at least one of the following: at least one of the customer test data records, at least one of the account records, at least one of the transaction records, at least one of the transaction types, and at least one of the transaction records.

10. The method of claim 1, wherein each parameter comprises at least one of a number of test data records to generate, a maximum number of first elements per customer test data record, and a maximum number of second elements per first element.

11. A method for generating test data that simulates real world customer transaction data, comprising:
at least one computer processor receiving at an interface one or more parameters, wherein each parameter represents a limitation on customer test data records to be generated;
the at least one computer processor generating a first reference file defining a plurality of first element types;
the at least one computer processor generating a second reference file defining a plurality of second element types;
the at least one computer processor generating a plurality of customer test data records based on the one or more parameters, wherein each customer test data record comprises a plurality of data fields, the data in each data field having a format that simulates real-world data;
the at least one computer processor verifying a uniqueness of each of the plurality of customer test data records;
the at least one computer processor generating a random number of first elements for each customer test data record based on the first reference file; and
the at least one computer processor generating a random number of second elements for each first element based on the second reference file
the at least one computer processor generating one or more delimited text files from the plurality of customer test data records, accounts, and transactions.

12. The method of claim 11, wherein the delimited text files are normalized.

13. A system for generating customer transaction test data that simulates real world customer transaction data, comprising:
a memory;
at least one interface; and
at least one computer programed to perform the following:
receive at the interface one or more parameters, wherein each parameter represents a limitation on customer test data records to be generated;
generate an account type reference file defining a plurality of account types;
generate a transaction type reference file defining a plurality of transaction types;
generate a plurality of customer test data records based on one or more parameters, wherein each customer test data record comprises a plurality of data fields, the data in each data field having a format that simulates real-world data;
verify a uniqueness of each of the plurality of customer test data records;
generate a random number of accounts for each customer test data record based on the account type reference file; and
generate a random number of transactions for each account based on the transaction type reference file
generate one or more delimited text files from the plurality of customer test data records, accounts, and transactions.

14. The system of claim 13, further comprising:
at least one second computer processor executing a software program using at least one of the following: at least one of the customer test data records, at least one of the account records, at least one of the transaction records, at least one of the transaction types, and at least one of the transaction records.

15. The system of claim 13, wherein the delimited text files are normalized.

16. The system of claim 13 wherein each parameter comprises at least one of a number of customer test data records to generate, a maximum number of account types per customer test data record, and a maximum number of transaction types per account type, and a maximum number of transactions per account type.

17. The system of claim 13, further comprising a database that stores the plurality of customer test data records, account records, transaction records, transaction types, and transaction records.

18. The system of claim 17, wherein the at least one computer processor further generates a plurality of keys link some of the customer test data records, account records, transaction records, transaction type records, and transaction records, the keys selected from the group consisting of a customer identifier, an account identifier, a transaction identifier, an effective data, a transaction date, a transaction type code, and an account type code.

19. The system of claim 17, wherein each of the customer test data records, account records, transaction records, transaction type records, and transaction records includes at least one of a customer identifier, an account identifier, a transaction identifier, an effective data, a transaction date, a transaction type code, and an account type code.

20. The system of claim 17, wherein the uniqueness of each of the plurality of customer test data records is based on a uniqueness of a combination of data fields for each customer test data record.

\* \* \* \* \*